United States Patent
Jeon et al.

(10) Patent No.: US 10,003,618 B2
(45) Date of Patent: Jun. 19, 2018

(54) DEVICE AND METHOD FOR PROVIDING MOBILE INTERNET CALL SERVICE

(71) Applicant: SK PLANET CO., LTD., Seongnam-si, Gyeonggi-do (KR)

(72) Inventors: Jinho Jeon, Seoul (KR); Eunbok Lee, Seoul (KR); Kyunghee Kim, Seoul (KR)

(73) Assignee: SK PLANET CO., LTD., Seongnam-si (KR)

(*) Notice: Subject to any disclaimer, the term of this patent is extended or adjusted under 35 U.S.C. 154(b) by 718 days.

(21) Appl. No.: 14/559,659

(22) Filed: Dec. 3, 2014

(65) Prior Publication Data

US 2015/0085813 A1 Mar. 26, 2015

Related U.S. Application Data

(63) Continuation of application No. PCT/KR2013/006297, filed on Jul. 15, 2013.

(30) Foreign Application Priority Data

Oct. 30, 2012 (KR) .......................... 10-2012-0121104

(51) Int. Cl.
*H04W 4/00* (2018.01)
*H04L 29/06* (2006.01)
(Continued)

(52) U.S. Cl.
CPC ...... *H04L 65/1069* (2013.01); *H04L 61/2567* (2013.01); *H04L 65/1006* (2013.01);
(Continued)

(58) Field of Classification Search
CPC .... H04W 88/02; H04W 88/08; H04L 5/0048; H04L 5/0053; H04L 5/0055
(Continued)

(56) References Cited

U.S. PATENT DOCUMENTS

2001/0012345 A1* 8/2001 Nolting ............... H04M 3/2281
379/112.01
2001/0028654 A1* 10/2001 Anjum ................ H04Q 3/0045
370/352
(Continued)

FOREIGN PATENT DOCUMENTS

CN 102318323 A 1/2012
KR 1020070090372 A 9/2007

OTHER PUBLICATIONS

Chinese Office Action for corresponding Chinese Patent Application No. 201380028559.9 dated Dec. 6, 2016.
(Continued)

*Primary Examiner* — Andrew Chriss
*Assistant Examiner* — Atique Ahmed
(74) *Attorney, Agent, or Firm* — Brinks Gilson & Lione (57) ABSTRACT

Disclosed are a device and method for providing a mobile Internet call service. In order to reduce a call waiting time for an mVoIP call, when a call is an initial call after power of a terminal is turned on or using the main call number, information for a call connection is acquired in advance and a light weight session is maintained. When the mVoIP call is made later, the maintained light weight session is used to make a direct P2P call. Therefore, it is possible to reduce a call connection time. As a result, a call waiting time is significantly reduced and thus it is possible to provide a rapid response and improve user satisfaction. When the light weight session is maintained, access to a separate server system is not performed. As a result, it is possible to connect a P2P call even when call traffic is heavy.

4 Claims, 5 Drawing Sheets

(51) Int. Cl.
*H04L 29/08* (2006.01)
*H04L 29/12* (2006.01)
(52) U.S. Cl.
CPC ........ *H04L 65/1059* (2013.01); *H04L 67/104* (2013.01); *H04W 76/10* (2018.02); *H04W 76/14* (2018.02); *H04L 61/1529* (2013.01); *H04L 61/2514* (2013.01); *H04L 61/2564* (2013.01)
(58) Field of Classification Search
USPC .......................................................... 370/329
See application file for complete search history.

(56) References Cited

U.S. PATENT DOCUMENTS

| | | | |
|---|---|---|---|
| 2002/0141548 A1* | 10/2002 | Boda | H04M 1/271 379/88.01 |
| 2006/0203750 A1* | 9/2006 | Ravikumar | H04L 63/102 370/261 |
| 2007/0121604 A1 | 5/2007 | Chandra et al. | |
| 2008/0148379 A1 | 6/2008 | Xu et al. | |
| 2008/0317227 A1 | 12/2008 | Croak et al. | |
| 2010/0226362 A1* | 9/2010 | Kim | H04L 12/14 370/352 |
| 2012/0110192 A1 | 5/2012 | Lu et al. | |
| 2012/0113899 A1 | 5/2012 | Overmars | |

OTHER PUBLICATIONS

International Search Report for PCT/KR2013/006297 dated Nov. 11, 2013.
European Search Report dated May 17, 2016 corresponding to European Patent Application No. 13851384.1.

* cited by examiner

DEVICE AND METHOD FOR PROVIDING MOBILE INTERNET CALL SERVICE

CROSS-REFERENCE TO RELATED APPLICATION

The present application is a continuation of International Application No. PCT/KR2013/006297 filed on Jul. 15, 2013, which is based on, and claims priority from, Korean Patent Application No. 10-2012-0121104 filed on Oct. 30, 2012. The disclosures of the above-listed application are hereby incorporated by reference herein in their entirety.

TECHNICAL FIELD

The present invention relates to a mobile Internet call service, and more specifically, to a device and method for providing a mobile Internet call service that can minimize a waiting time for an actual call by reducing preprocessing for a mobile Internet (mobile voice over Internet protocol, hereinafter referred to as an mVoIP) call, that is, a time taken for an information acquisition process necessary for a call connection in call originating for a mobile Internet call.

BACKGROUND ART

Recently, due to the development of mobile Internet through mobile terminals such as smartphones, a plurality of services including an mVoIP call service have been developed.

This mVoIP is technology that can use an Internet phone using a terminal through Wi-Fi (a wireless LAN) and wireless mobile Internet such as a 3G network. A transmission rate of the mVoIP is lower than that of a VoIP. However, as Internet-enabled terminals such as a smartphone become popular, the number of mVoIP subscribers has rapidly increased. It is no exaggeration to say that all users of Internet-enabled terminals are potential mVoIP users.

However, up to now, in call originating for an mVoIP call, preprocessing of network address translation (NAT) information acquisition and signaling such as a session initiation protocol (SIP) is necessary in the terminal. Therefore, much preprocessing time is necessarily required until an actual call is connected.

Accordingly, due to a preprocessing time after the mVoIP call is made, that is, a call waiting time, a service quality degrades and users complain about the service. Therefore, there is an urgent need to develop technology for reducing a waiting time taken for the mVoIP call.

DISCLOSURE

Technical Problem

In view of the above-described problems, the invention provides a device and method for providing a mobile Internet call service that can provide a rapid response and improve user satisfaction by significantly reducing a call waiting time when an mVoIP call attempt is made.

Technical Solution

According to an aspect of the invention, there is provided a device for providing a mobile Internet call service. The device includes a communication unit configured to perform communication for a mobile Internet call service, a storage unit configured to store a call list including at least one main call number and network address translation (NAT) information for a call connection, and a control unit configured to perform control such that, when power of a terminal is turned on, a signal that can obtain NAT information for a mobile Internet call of the main call number is sent, NAT information for a call connection is acquired and stored, a light weight session is generated using the NAT information, the generated light weight session is maintained, and when a mobile Internet call request is made for the main call number, the light weight session is used to perform a direct call connection.

The control unit may perform control such that, when a call is an initial mobile Internet call using a main call number, a signal that can obtain NAT information for the mobile Internet call of the main call number is sent, NAT information for a call connection is obtained and stored, a light weight session is generated using the NAT information, the generated light weight session is maintained, and when a mobile Internet call request is made for the main call number, the light weight session is used to perform a direct call connection.

The control unit may perform control such that, when the number of main call numbers is greater than a predetermined number, the number of call connection attempts of main call numbers is measured for a predetermined time, a priority is designated in descending order of the measured number of attempts, the light weight session is generated for only the main call numbers of a predetermined number based on the designated priority, and the generated light weight session is maintained.

The information for the call connection may include NAT information.

The control unit may perform control such that the acquired information for a call connection is stored in the storage unit and the stored call connection information is used to control a call connection when the call connection is directly controlled using the light weight session.

According to another aspect of the invention, there is provided a method of providing a mobile Internet call service. The method includes sending a signal that can acquire NAT information for a mobile Internet call of a preset main call number when power is turned on and acquiring NAT information for a call connection, storing the acquired NAT information, generating a light weight session using the NAT information and maintaining the generated light weight session, and performing a call connection using the light weight session when a mobile Internet call request is made for the main call number.

The method may further include storing a main call number list including at least one main call number before the acquiring of the NAT information.

The method may further include determining whether a calling number is the main call number when the mobile Internet call is made, and attempting a call connection using the stored call connection information when it is determined that the calling number is the main call number.

According to still another aspect of the invention, there is provided a method of providing a mobile Internet call service. The method includes storing a main call number list including at least one main call number, determining whether a call is an initial mobile Internet call after power is turned on when a mobile Internet call is made, acquiring NAT information for a call connection when the call is the initial mobile Internet call after power is turned on, and storing the acquired NAT information, generating a light weight session using the NAT information and maintaining the generated light weight session, and performing a call connection using the light weight session when a mobile Internet call request is made for the main call number.

The determining may further include determining whether a calling number of the call is the main call number when the call is not the initial mobile Internet call, and attempting a call connection using the stored call connection information when it is determined that the calling number of the call is the main call number.

According to yet another aspect of the invention, there is provided a computer readable recording medium for recording a program that executes the method of providing a mobile Internet call service.

Advantageous Effects

In order to reduce a call waiting time for the mVoIP call, when a call is an initial call after power of a terminal is turned on or using the main call number, information for a call connection is acquired in advance and the light weight session is maintained. When the mVoIP call is made later, the light weight session is used to make a direct P2P call. Therefore, it is possible to reduce a call connection time. As a result, when the mVoIP call attempt is made, a call waiting time is significantly reduced and thus it is possible to provide a rapid response and improve user satisfaction.

In addition, server system access for NAT information acquisition and SIP signaling is unnecessary. As a result, it is possible to make a P2P call connection even when call traffic is heavy.

Further, when the mobile Internet call service is provided, establishment of a separate server system is unnecessary and thus it is possible to reduce an establishment cost.

Moreover, when the light weight session is maintained, access to a separate server system is not performed. As a result, it is possible to make a P2P call even when call traffic is heavy.

MODES OF THE INVENTION

In the invention, in order to address a problem of a long waiting time up to calling due to preprocessing for a call connection after call originating for an mVoIP call, information necessary for the call connection is acquired in advance. At the time of call originating for an mVoIP call, the call connection is immediately performed using stored information. Therefore, it is possible to reduce a waiting time for the call connection. Here, the information necessary for the call connection refers to port information such as NAP information. In order to attempt a direct call connection without preprocessing, the information necessary for the call connection is acquired in advance and the acquired information is used to attempt the direct call connection. This state refers to a state in which a light weight session is maintained. Hereinafter, the term "light weight session" may be used as a term to indicate a state in which a direct connection is not made with a partner terminal but information necessary for a call connection is acquired, and thus a direct call connection can be performed using the acquired information.

First, a configuration of a mobile Internet call service providing system in order to describe operations of the invention will be described with reference to FIG. 1.

Figure 1:
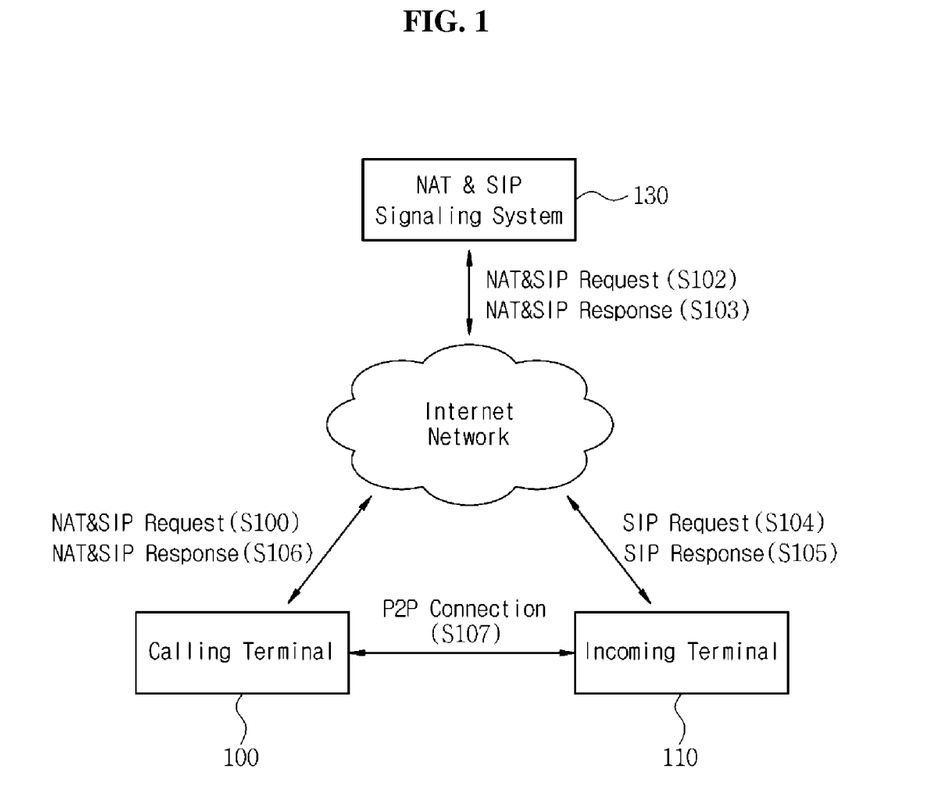
FIG. 1 is a diagram illustrating a configuration of a mobile Internet call service providing system in order to describe operations of the invention.

As illustrated in FIG. 1, when there is an mVoIP call request from a calling terminal 100 to an incoming terminal 110, an NAT information acquisition process and an SIP signaling process are performed through an Internet network 120 and an NAT & SIP signaling system 130 (S100 to S106). Then, the calling terminal 100 attempts a P2P connection with the incoming terminal 110 using the acquired NAT information (S107).

In description of the invention, since an mVoIP call service providing system, units of the system, the NAT information acquisition process and the SIP signaling process for an mVoIP call service are well-known techniques, a detailed description thereof will be omitted.

As described above, in a current system, whenever there is an mVoIP call request, an operation of S107 is performed after operations of S100 to S106 are performed. However, according to the invention, operations of S100 to S106 are performed as described in FIG. 1 only when a call is an initial call after power of a terminal is turned on or using a main call number. NAT information acquired through these operations is stored and the light weight session is maintained. In this case, since it is difficult to maintain the light weight session for many call subjects, the light weight session is maintained for only the main call number that is predetermined by a user. In addition, when there are many predetermined main call numbers, it is difficult to maintain the light weight session for all main call numbers. Therefore, it is necessary to prepare an algorithm for designating a priority of the main call numbers and a policy for increasing a hit rate in the terminal in advance. For example, an algorithm in which the number of call connection attempts for the main call numbers is measured for a predetermined time and a priority is designated in descending order of the measured number of attempts may be used.

A configuration between a calling terminal and an incoming terminal in an mVoIP call service providing system according to an embodiment of the invention will be described with reference to FIG. 2.

First, an application capable of supporting an mVoIP call service is downloaded and stored in terminals 200 and 210 according to the invention.

Figure 2:
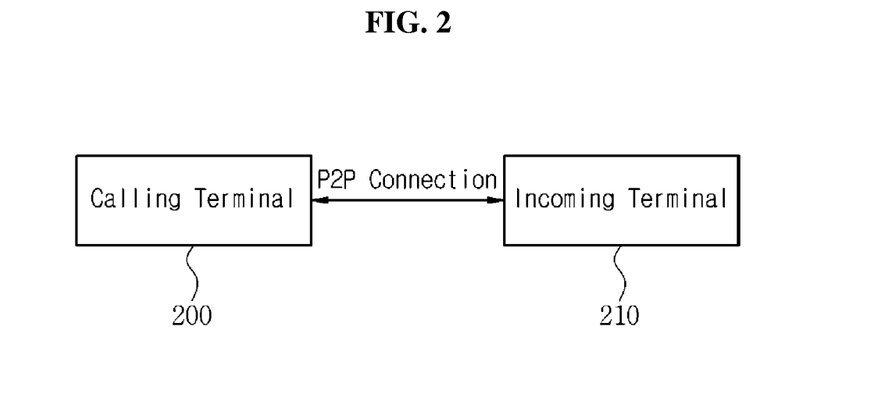
FIG. 2 is a diagram illustrating a configuration between a calling terminal and an incoming terminal in an Internet call service system according to an embodiment of the invention.

As illustrated in FIG. 2, in the invention, the light weight session is previously set for the main call number and is maintained as described in FIG. 1. Then, when the calling terminal 200 requests an mVoIP call, the NAT information acquisition process and the SIP signaling process (S100 to S106) in FIG. 1 are not performed. As illustrated in FIG. 2, a direct P2P connection attempt is made. In this way, it is possible to reduce a call waiting time.

An internal configuration of a terminal according to an embodiment of the invention will be described with reference to FIG. 3.

Figure 3:
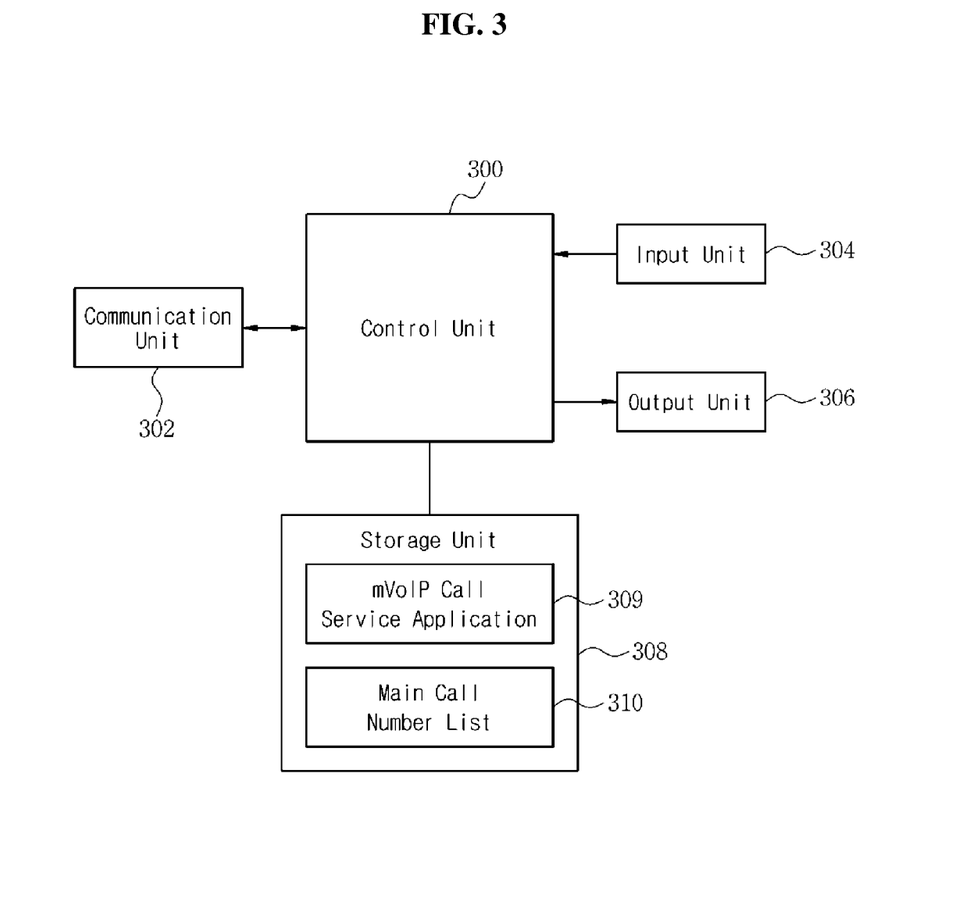
FIG. 3 is a diagram illustrating a configuration of a terminal for providing an Internet call service according to an embodiment of the invention.

As illustrated in FIG. 3, the terminal 200 may include a control unit 300, a communication unit 302, an input unit 304, an output unit 306, and a storage unit 308.

The control unit 300 controls overall operations of the terminal 200 and operations related to application driving for an mVoIP call service.

The control unit 300 has different control operations according to two embodiments. First, control operations for the mVoIP call service according to a first embodiment will be described.

The control unit 300 according to the first embodiment performs a signaling process of sending a signal for acquiring NAT information of the main call numbers that are predetermined by the user when power of the terminal 200 is initially turned on. In this case, signaling may include an SIP, an XMPP, or a third party protocol. In addition, the control unit 300 checks whether NAT information of the incoming terminal 210 is present in the NAT & SIP signaling system 130 having NAT information of a plurality of terminals. When corresponding NAT information may not be transmitted to the terminal 200, the control unit 300 sends signaling of NAT information to the incoming terminal 210 and the incoming terminal 210 transmits only a response signal therefor.

Then, the control unit 300 stores the acquired NAT information of predetermined main call numbers, that is, information for a call connection, in the storage unit 308. When there is call originating for an mVoIP call, the control unit 300 performs control such that pre-stored NAT information is used to attempt a P2P call connection to the incoming terminal according to whether a calling number is a number stored as the main call number.

When there is call originating for an mVoIP call, the control unit 300 according to the second embodiment determines whether a calling number is an initial call request. When the calling number is a number of an initial call request, the control unit 300 performs control such that the NAT information acquisition and the SIP signaling process are performed, the acquired NAT information is used to attempt a P2P call connection to the incoming terminal, and the acquired NAT information is not deleted but stored in the storage unit 308, and may be used for call originating for an mVoIP call that is generated later. On the other hand, when the calling number is not a number of an initial call request, the control unit 300 performs control such that stored NAT information is used to attempt a P2P call connection to the incoming terminal.

As described above, a state in which the NAT information is stored in advance and a session for a call connection is maintained in order to reduce a waiting time for a call connection when an mVoIP call service is provided is referred to as a light weight session state. Such a light weight session may be initialized when power of the terminal is turned on or off.

The communication unit 302 transmits and receives data for the mVoIP call service via a communication network. This communication unit 302 may transmit and receive data through various communication methods in addition to wired and wireless methods. In addition, the communication unit 302 may transmit and receive data using at least one communication method. To this end, the communication unit 302 may include a plurality of communication modules that transmit and receive data according to different communication methods.

The input unit 304 may generate a user input signal corresponding a user request or information in response to the user's manipulation. The input unit 304 may be implemented by currently available input devices or input devices to be commercialized. Examples of the input unit may include general input devices such as a keyboard, a mouse, a joystick, a touch screen, and a touch pad, and gesture input devices in which the user's motion is detected and a specific input signal is generated.

The output unit 306 enables an operation result or a state of the terminal 200 to be recognized by the user. Examples of the output unit may include a display unit configured to visually output the result and state through a screen or a speaker configured to output audible sound. In particular, according to the invention, a screen related to the mVoIP call service that is operated in the terminal 200 may be displayed.

The storage unit 308 stores information necessary for operating the terminal 200, and in particular, stores an application that provides the mVoIP call service according to the invention and a main call number list 310. Here, the main call number list is a list in which subjects who are frequently contacted by the user through the mVoIP call are pre-set by the user and stored. The storage unit 308 may include a hard disk, a floppy disk, magnetic media such as a magnetic tape, optical media such as a compact disc read only memory (CD-ROM) and a digital video disc (DVD), magneto-optical media such as a floptical disk, a ROM, a random access memory (RAM), and a flash memory.

A method of providing an mVoIP call service in the terminal 200 configured as described above will be described in detail with reference to FIGS. 4 to 6.

Figure 4:
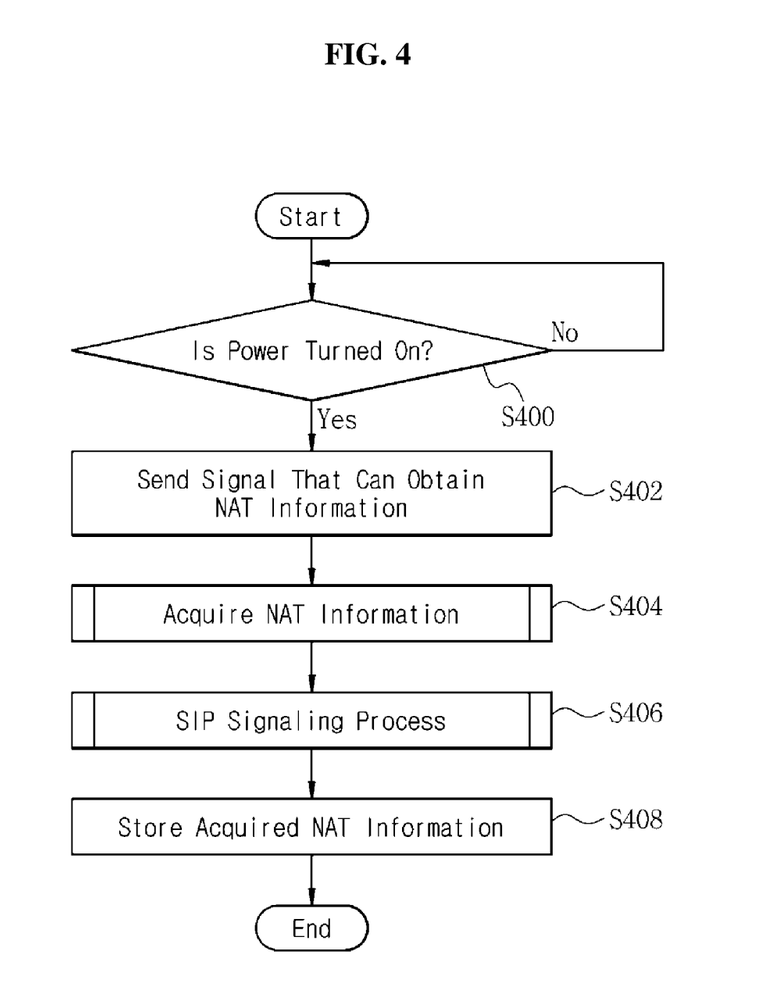
FIG. 4 is a flowchart illustrating an initial setting process in a terminal for providing an Internet call service according to a first embodiment of the invention.
Figure 5:
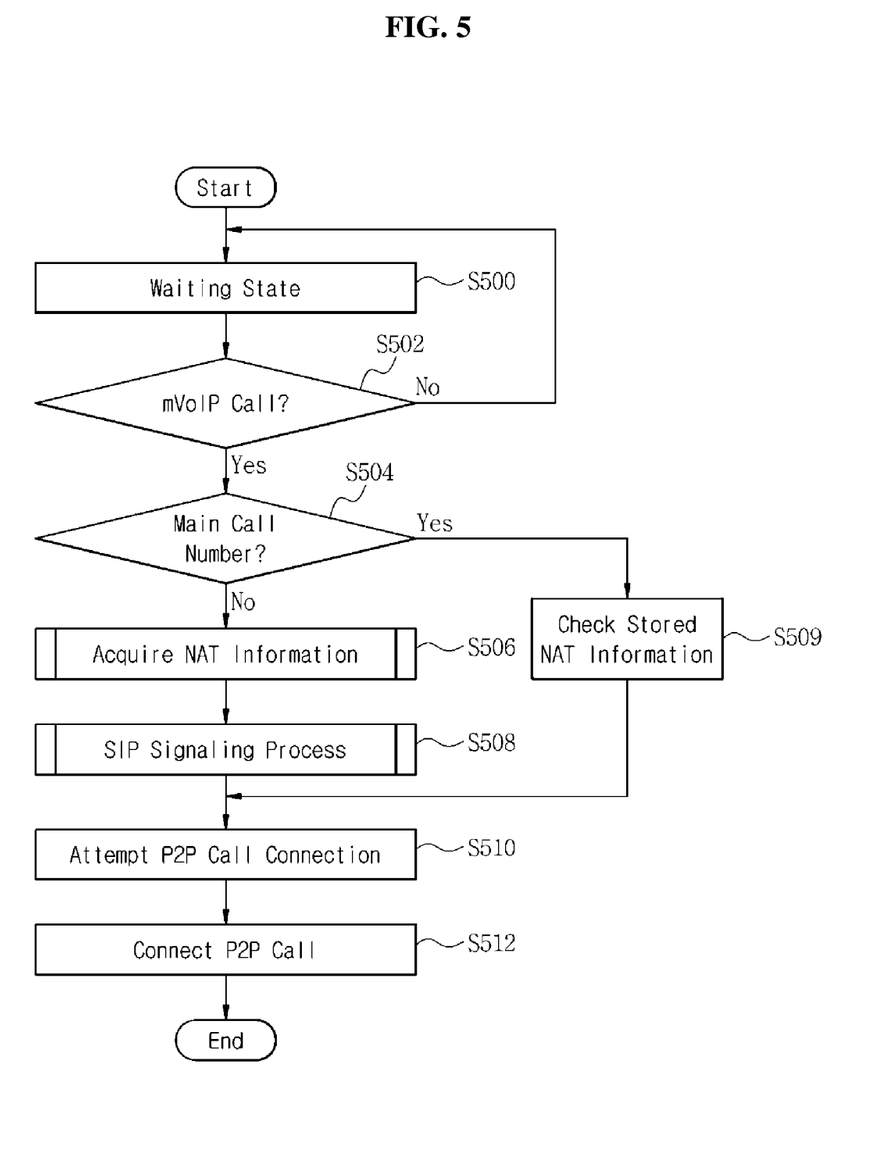
FIG. 5 is a flowchart illustrating a call connection process in the terminal for providing an Internet call service according to the first embodiment of the invention.

FIGS. 4 and 5 are flowcharts illustrating an initial setting and call connection process in a terminal for providing an Internet call service according to the first embodiment of the invention. FIG. 6 is a flowchart illustrating a call connection process in a terminal for providing an Internet call service according to the second embodiment of the invention. It is assumed that the main call number list is set by the user and stored in advance when the first and second embodiments are described.

First, an mVoIP call service process according to the first embodiment will be described with reference to FIGS. 4 and 5.

As illustrated in FIG. 4, when power is turned on, the control unit 300 of the terminal 200 sends a signal that can obtain NAT information of the main call numbers preset by the user (S400 and S402). That is, when power of the terminal 200 is initially turned on, the control unit 300 performs a signaling process for acquiring NAT information of the main call numbers preset by the user. In this case, the signaling may include an SIP, an XMPP, or a third party protocol.

In addition, the control unit 300 checks whether NAT information of the incoming terminal 210 is present in the NAT & SIP signaling system 130 having NAT information of a plurality of terminals. When corresponding NAT information may not be transmitted to the terminal 200, the control unit 300 sends signaling of NAT information to the incoming terminal 210 and the incoming terminal 210 transmits only a response signal therefor.

The control unit 300 performs the NAT information acquisition and the SIP signaling process through the communication unit 302 (S404 and S406).

Then, the control unit 300 stores the acquired NAT information (S408).

While the NAT information is previously stored as described in the process of FIG. 4 and the light weight session is maintained for the main call number, a call connection process when an mVoIP call attempt is made for a predetermined main call number will be described with reference to FIG. 5.

As illustrated in FIG. 5, while a waiting state is maintained, when an mVoIP call is requested, the control unit 300 determines whether a calling number is a preset main call number (S500 to S504).

When the calling number is the preset main call number, NAT information stored in the storage unit 308 is checked (S509), the checked NAT information is used to attempt a P2P call connection, and the mVoIP call is connected (S510 and S512).

In S504, when it is determined that the calling number is not the preset main call number, the NAT information acquisition and the SIP signaling process are performed (S506 and S508). Then, the acquired NAT information is used to attempt a P2P call connection and the mVoIP call is connected (S510 and S512).

An mVoIP call service process according to the second embodiment will be described with reference to FIG. 6.

Figure 6:
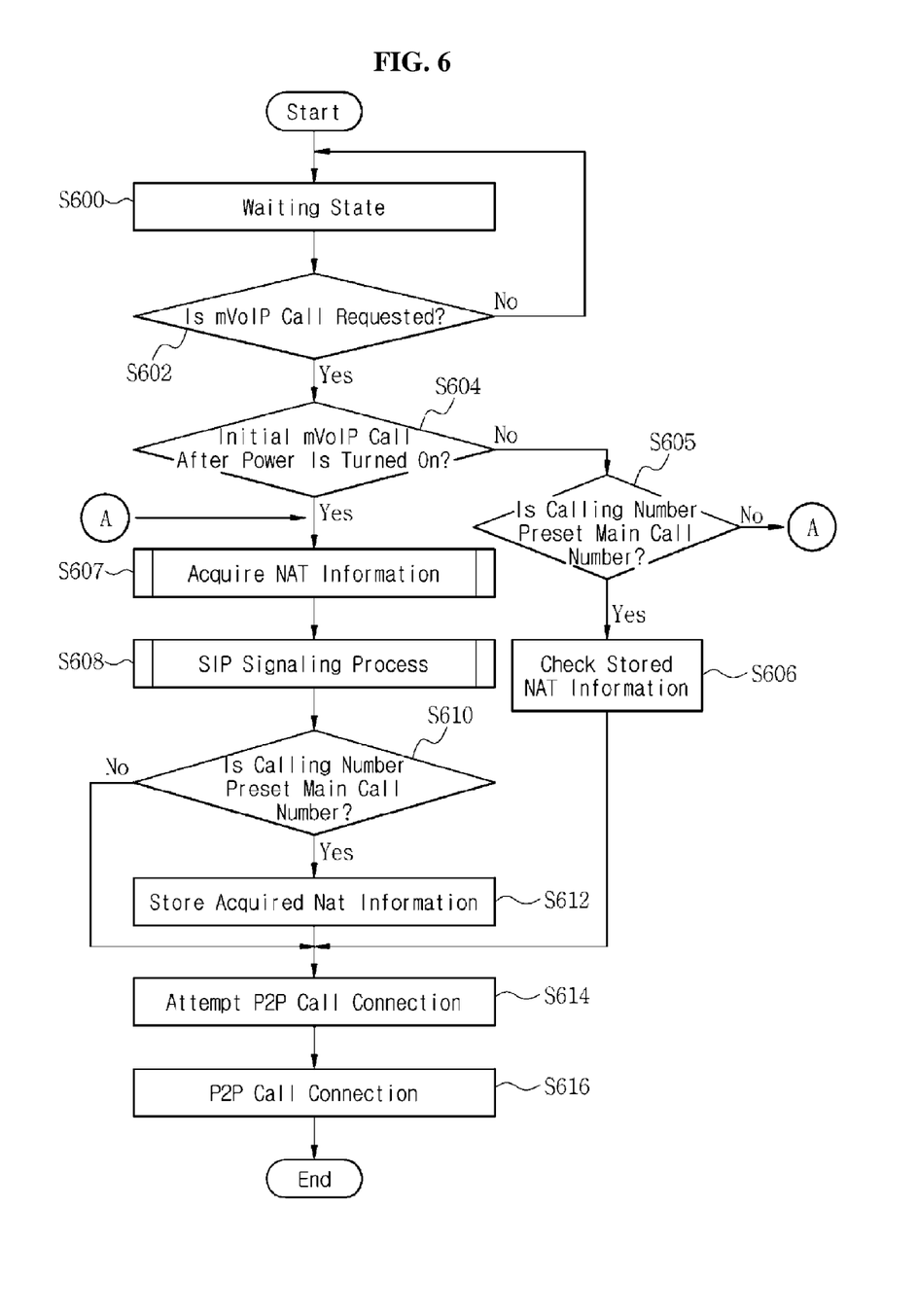
FIG. 6 is a flowchart illustrating a call connection process in a terminal for providing an Internet call service according to a second embodiment of the invention.

As illustrated in FIG. 6, while a waiting state is maintained, when an mVoIP call is requested, the control unit 300 determines whether the call is an initial call for the mVoIP service after power is turned on (S600 to S604).

When the call is the initial call, the control unit 300 performs the NAT information acquisition and the SIP signaling process (S607 and S608).

Then, the control unit 300 determines whether a calling number is a preset main call number (S610). When it is determined that the calling number is the preset main call number, the acquired NAT information is stored in the storage unit 308, the acquired NAT information is used to attempt a P2P call connection, and the mVoIP call is connected (S612 to S616).

On the other hand, in S610, when it is determined that the calling number is not the preset main call number, the acquired NAT information is not stored. The acquired NAT information is used to attempt a P2P call connection and the mVoIP call is connected (S614 and S616).

In S604, when it is determined that the call is not the initial call for the mVoIP service after power is turned on, the control unit 300 determines whether the calling number is the preset main call number (S605). Then, when the calling number is the preset main call number, the control unit 300 checks pre-stored NAT information (S606). Then, the control unit 300 uses the checked NAT information to attempt a P2P call connection and the mVoIP call is connected (S614 and S616).

On the other hand, in S605, when it is determined that the calling number is not the preset main call number, the process proceeds to an operation A and the NAT information acquisition and the SIP signaling process are performed (S607 and S610).

Then, when the calling number is the preset main call number, the control unit 300 stores the acquired NAT information in the storage unit 308, the acquired NAT information is used to attempt a P2P call connection and the mVoIP call is connected (S610 to S616).

On the other hand, in S610, when it is determined that the calling number is not the preset main call number, the acquired NAT information is not stored, the acquired NAT information is used to attempt a P2P call connection, and the mVoIP call is connected (S614 and S616).

A method for using an mVoIP call service according to the invention may be implemented in the form of software that can be read by various computer devices and may be stored in a computer readable medium. Here, recording media may include a program instruction, a data file, a data structure, and/or combinations thereof. The program instruction recorded in the recording media may be specially designed and prepared for the invention or may be an available well-known instruction for those skilled in the field of computer software. The recording media include a hardware device that is specially made to store and perform the program instruction, for example, a hard disk, a floppy disk, magnetic media such as a magnetic tape, optical media such as a CD-ROM and a DVD, magneto-optical media such as a floptical disk, a ROM, a RAM, and a flash memory. Examples of the program instruction may include a machine code generated by a compiler and a high-level language code that can be executed in a computer using an interpreter. Such a hardware device may be configured as at least one software module in order to perform operations of the invention and vice versa.

As described above, according to the invention, the light weight session having minimum resources is generated for the mVoIP call in advance and the light weight session is maintained for the calling number designated as the main call number preset by the user. When call originating to the main call number is requested, the maintained light weight session is used to attempt a direct P2P call connection and thus a call waiting time may be reduced. In addition, when the light weight session is maintained, access to a separate server system is not performed. As a result, it is possible to connect a P2P call even when call traffic is heavy.

The embodiments disclosed in this specification and drawings are only examples to help understanding of the invention and the invention is not limited thereto. It is apparent to those skilled in the art that various modifications based on the technological scope of the invention in addition to the embodiments disclosed herein can be made.

The present invention relates to a device and method for providing a mobile Internet call service. In order to reduce a call waiting time for the mVoIP call, when a call is an initial call after power of the terminal is turned on or using the main call number, information for a call connection is acquired in advance and the light weight session is maintained. When the mVoIP call is made later, the maintained light weight session is used to make a direct P2P call. Therefore, it is possible to reduce a call connection time. When the light weight session is maintained, access to a separate server system is not performed. As a result, it is possible to connect a P2P call even when call traffic is heavy. Accordingly, it is possible to contribute to development of a mobile Internet call service industry. The embodiment has a high probability of commercialization or sale, is clearly implementable in reality, and thus has industrial applicability.

The invention claimed is:

1. A method of providing a mobile voice over Internet protocol (mVoIP) call service, the method comprising:
    storing a main call number list including at least one main call number;
    sending a signal that can acquire network address translation (NAT) information for a mobile Internet call of a preset main call number when power is turned on and acquiring NAT information for a call connection;
    storing the acquired NAT information; generating a light weight session using the NAT information and maintaining the generated light weight session; and performing a call connection using the light weight session when a mobile Internet call request is made for the main call number, wherein the number of main call numbers is greater than a predetermined number, the number of call connection attempts of main call numbers is measured for a predetermined time, a priority is designated in descending order of the measured number of attempts, the light weight session is generated for only the main call numbers of a predetermined number based on the designated priority, and the generated light weight session is maintained, wherein the main call number list is a list in which subjects who are frequently contacted by the user through the mVoIP call service are pre-set by the user and stored, and wherein the light weight session is a state in which the NAT information is stored in advance and a session for a call connection is maintained in order to reduce a waiting time for a call connection.

2. The method according to claim 1, further comprising: determining whether a calling number is the main call number when the mobile Internet call is made; and attempting a call connection using the stored call connection information when it is determined that the calling number is the main call number.

3. A method of providing a mobile voice over Internet protocol (mVoIP) call service, the method comprising:

storing a main call number list including at least one main call number;

determining whether a call is an initial mobile Internet call after power is turned on when a mobile Internet call is made;

acquiring network address translation (NAT) information for a call connection when the call is the initial mobile Internet call after power is turned on, and storing the acquired NAT information;

generating a light weight session using the NAT information and maintaining the generated light weight session; and performing a call connection using the light weight session when a mobile Internet call request is made for the main call number, wherein the number of main call numbers is greater than a predetermined number, the number of call connection attempts of main call numbers is measured for a predetermined time, a priority is designated in descending order of the measured number of attempts, the light weight session is generated for only the main call numbers of a predetermined number based on the designated priority, and the generated light weight session is maintained;

wherein the main call number list is a list in which subjects who are frequently contacted by the user through the mVoIP call service are pre-set by the user and stored, and wherein the light weight session is a state in which the NAT information is stored in advance and a session for a call connection is maintained in order to reduce a waiting time for a call connection.

4. The method according to claim 3, wherein the determining further includes:

determining whether a calling number of the call is the main call number when the call is not the initial mobile Internet call; and attempting a call connection using the stored call connection information when it is determined that the calling number of the call is the main call number.

* * * * *